(12) United States Patent
Huang et al.

(10) Patent No.: US 11,897,119 B2
(45) Date of Patent: Feb. 13, 2024

(54) ENCODER MODULE ADAPTED FOR A ROBOTIC ARM

(71) Applicant: TECHMAN ROBOT INC., Taoyuan (TW)

(72) Inventors: Chien-Chang Huang, Taoyuan (TW); Yao-Ching Tsai, Taoyuan (TW)

(73) Assignee: TECHMAN ROBOT INC., Taoyuan (TW)

( * ) Notice: Subject to any disclaimer, the term of this patent is extended or adjusted under 35 U.S.C. 154(b) by 399 days.

(21) Appl. No.: 17/476,447

(22) Filed: Sep. 15, 2021

(65) Prior Publication Data
US 2022/0111537 A1    Apr. 14, 2022

(30) Foreign Application Priority Data

Oct. 14, 2020 (TW) ................................ 109135856

(51) Int. Cl.
| | |
|---|---|
| B25J 13/00 | (2006.01) |
| B25J 13/08 | (2006.01) |
| B25J 19/00 | (2006.01) |
| B25J 17/00 | (2006.01) |
| G01D 5/347 | (2006.01) |

(52) U.S. Cl.
CPC ............ B25J 13/088 (2013.01); B25J 17/00 (2013.01); B25J 19/0075 (2013.01); G01D 5/3473 (2013.01)

(58) Field of Classification Search
CPC ...... B25J 13/088; B25J 17/00; B25J 19/0075; G01D 5/3473
See application file for complete search history.

(56) References Cited

U.S. PATENT DOCUMENTS

| | | | |
|---|---|---|---|
| 10,500,734 B1 * | 12/2019 | Xiong ...................... B25J 17/00 |
| 2015/0360369 A1 * | 12/2015 | Ishikawa ................ B25J 9/1674 |
| | | | 901/23 |
| 2020/0080870 A1 * | 3/2020 | Tsai ...................... G01D 11/02 |

FOREIGN PATENT DOCUMENTS

| | | | | |
|---|---|---|---|---|
| CN | 206230537 U | * | 6/2017 | |
| CN | 108789480 A | * | 11/2018 | .............. B25J 17/00 |
| CN | 208663857 U | * | 3/2019 | .......... B25J 17/0258 |
| CN | 209717712 U | * | 12/2019 | |
| CN | 212178338 U | * | 12/2020 | |

(Continued)

*Primary Examiner* — Peter D Nolan
*Assistant Examiner* — Peter Y Ning
(74) *Attorney, Agent, or Firm* — Winston Hsu

(57) ABSTRACT

An encoder module adapted for a robotic arm is provided and includes a bracket, a bearing embedded in the bracket, an adaptor ring embedded in the bearing, a circuit board fixed on the bracket and an encoder plate. The bracket includes a ring-shaped structure. The adaptor ring includes a ring-shaped flange portion and a protruding portion. The protruding portion is located adjacent to an inner periphery of the ring-shaped flange portion and protrudes from the ring-shaped flange portion. An outer periphery and an inner periphery of the bearing engage with an inner periphery of the ring-shaped structure and an outer periphery of the protruding portion respectively. The circuit board includes a detector. The encoder plate is fixed on the ring-shaped flange portion and located at a position corresponding to the detector and between the detector and the adaptor ring. The encoder module has less accumulated error and improved accuracy.

10 Claims, 6 Drawing Sheets

(56) References Cited

FOREIGN PATENT DOCUMENTS

| CN | 114193507 A | * | 3/2022 | |
|---|---|---|---|---|
| CN | 116021545 A | * | 4/2023 | |
| CN | 219788393 U | * | 10/2023 | |
| JP | 2011176913 A | * | 9/2011 | ............ B25J 9/1633 |
| JP | 2020118591 A | * | 8/2020 | ............ G01D 5/142 |
| KR | 20190128893 A | * | 11/2019 | |
| WO | WO-2023175030 A1 | * | 9/2023 | ............ B25J 13/088 |

* cited by examiner

ENCODER MODULE ADAPTED FOR A ROBOTIC ARM

BACKGROUND OF THE INVENTION

1. Field of the Invention

The present invention relates to a robotic arm, and more specifically, to an encoder module adapted for a joint assembly of a robotic arm for detecting rotation.

2. Description of the Prior Art

A robotic arm has characteristics of flexible movement, precise positioning and continuous operation, and therefore has become a most popular apparatus for manufacture and assembly on a production line. In order to reduce movement error of the robotic arm and improve accuracy of control of the robotic arm, a correct detection of rotation of a motor is required.

Please refer to FIG. 6. FIG. 6 is a partial sectional diagram of a joint assembly 300 of a robotic arm in the prior art. As shown in FIG. 6, in order to detect rotation of a rotating shaft 303 of a motor 302 by an encoder 301, the encoder 301 includes an encoder plate 304. The encoder plate 304 is fixed on an adaptor 305, and the adaptor 305 is supported by an output shaft 306 to be connected to the rotating shaft 303, so that the encoder plate 304 is rotatable along with the rotation of the rotating shaft 303. Furthermore, a detector 307 for detecting the encoder plate 304 is fixed on a fixing plate 308 and located at a position corresponding to the encoder plate 304, and the fixing plate 308 is fixed on a housing 309, so that the detector 307 is fixedly disposed on the housing 309 indirectly. A rotating speed, a position and an acceleration of the joint assembly 300 can be obtained by detecting the encoder plate 304 with the detector 307 for controlling of the joint assembly 300.

However, since the detector 307 and the encoder plate 304 in the prior art are positioned by multiples elements, due to accumulated error of assembly, a rotating axis of the rotating shaft 303 may be misaligned with a rotating axis of the encoder plate 304, and the detector 307 may be located at a position not corresponding to the encoder plate 304. It not only causes rotation deviation between the rotating shaft 303 and the encoder plate 304 but also reduces detecting quality of the encoder 301, which decreases accuracy of rotation of the joint assembly 300 and performance of the joint assembly 300. Therefore, there is an urgent need to provide an improved encoder.

SUMMARY OF THE INVENTION

It is an objective of the present invention to provide an encoder module adapted for a robotic arm which has less accumulated error and improved accuracy and is capable of absorbing vibration caused by rotation of a joint assembly for solving the aforementioned problem.

In order to achieve the aforementioned objective, the present invention discloses an encoder module adapted for a robotic arm. The encoder module includes a bracket, a bearing, an adaptor ring, a circuit board and an encoder plate. The bracket includes a ring-shaped structure. A plurality of extending rods extend from an outer periphery of the ring-shaped structure. The bearing is embedded in the bracket. An inner periphery of the ring-shaped structure engages with an outer periphery of the bearing. The adaptor ring is embedded in the bearing. The adaptor ring includes a ring-shaped flange portion and a protruding portion. The protruding portion is located adjacent to an inner periphery of the ring-shaped flange portion and protrudes from a first side of the ring-shaped flange portion. An outer periphery of the protruding portion engages with an inner periphery of the bearing. The circuit board is fixed on the bracket and includes a detector. The encoder plate is fixed on a second side of the ring-shaped flange portion opposite to the first side of the ring-shaped flange portion. The encoder plate is located at a position corresponding to the detector and located between the detector and the adaptor ring.

According to an embodiment of the present invention, the encoder module further includes a dustproof cover fixed on the bracket and located between the circuit board and the encoder plate. The dustproof cover is spaced apart from the encoder plate and covers the encoder plate.

According to an embodiment of the present invention, the dustproof cover is formed in a ring shape. A plurality of protruding lugs protrude from an outer periphery of the dustproof cover. A number and a configuration of the plurality of protruding lugs are corresponding to a number and a configuration of the plurality of extending rods respectively, and the plurality of protruding lugs are fixed on the plurality of extending rods respectively.

According to an embodiment of the present invention, at least one detecting hole is formed on the dustproof cover, and the detector detects the encoder plate via the at least one detecting hole.

According to an embodiment of the present invention, the encoder module further includes a plurality of resilient components. Each of the plurality of resilient components is disposed on a distal end of the corresponding extending rod, and the encoder module is fixed on a shell of a joint assembly of the robotic arm by the plurality of resilient components.

According to an embodiment of the present invention, the encoder module further includes at least one screw component. At least one connecting hole is formed on the protruding portion. The at least one screw component passes through the at least one connecting hole to engage with a rotating shaft of the joint assembly for fixing the adaptor ring on the rotating shaft of the joint assembly.

According to an embodiment of the present invention, the rotating shaft of the joint assembly is an output shaft or an input shaft.

According to an embodiment of the present invention, a rotating axis of the encoder plate is aligned with a rotating axis of the rotating shaft.

According to an embodiment of the present invention, the plurality of extending rods are arranged in a radial symmetry.

According to an embodiment of the present invention, the detector is located at a position corresponding to a central portion of the encoder plate between an outer periphery of the encoder plate and an inner periphery of the encoder plate.

In summary, in the present invention, by the aforementioned configuration, the rotating axis of the rotating shaft can be aligned with the rotating axis of the encoder plate, and the detector can be located at a position corresponding to the encoder plate. Furthermore, the present invention is capable of absorbing vibration caused by rotation of the joint assembly by the plurality of resilient components. Therefore, the present invention has less accumulated error and improved accuracy.

These and other objectives of the present invention will no doubt become obvious to those of ordinary skill in the art after reading the following detailed description of the preferred embodiment that is illustrated in the various figures and drawings.

DETAILED DESCRIPTION

In order to illustrate technical specifications and structural features as well as achieved purposes and effects of the present invention, relevant embodiments and figures are described as follows.

Figure 1:
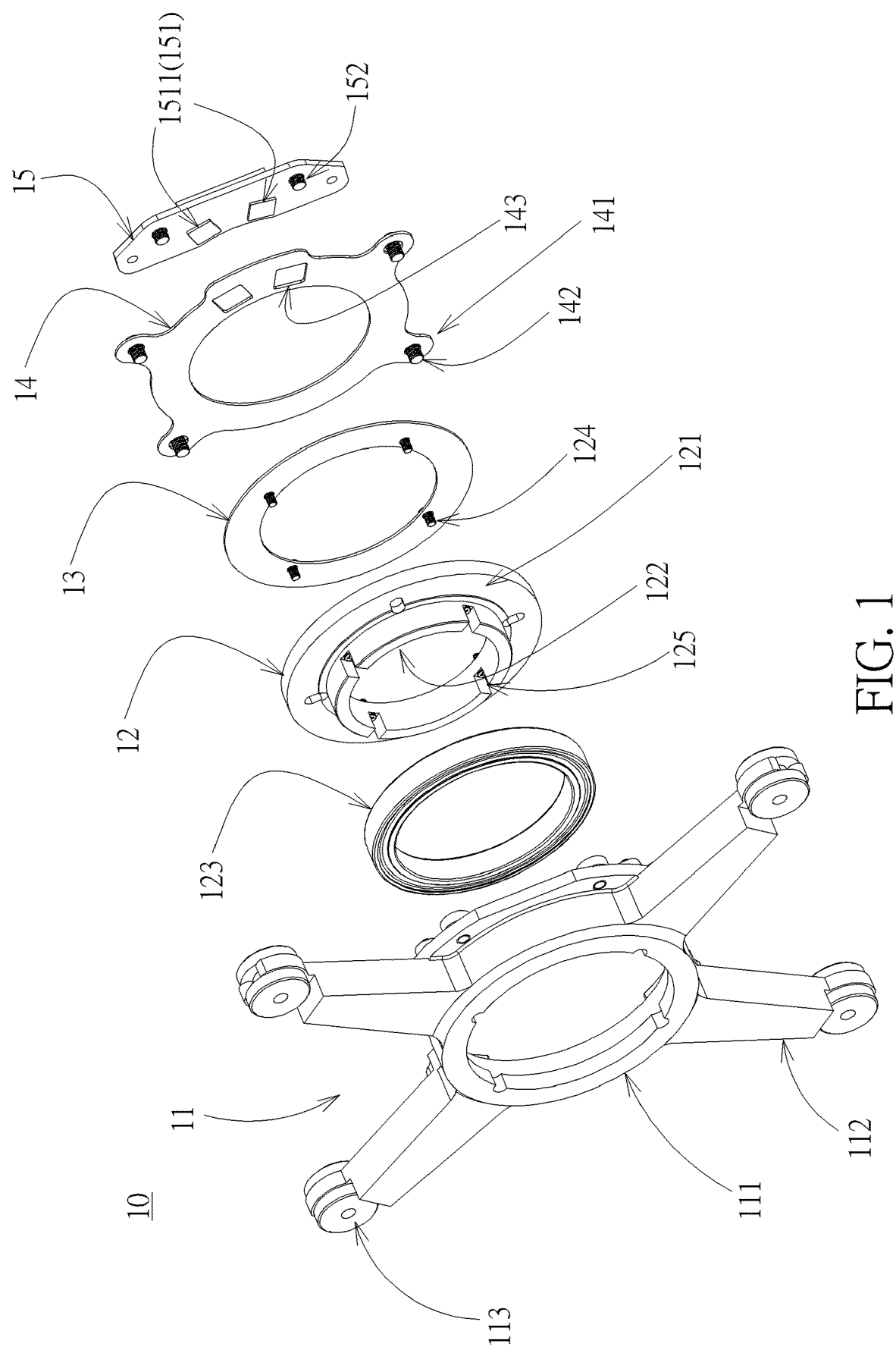
FIG. 1 is an exploded diagram of an encoder module according to an embodiment of the present invention.
Figure 2:
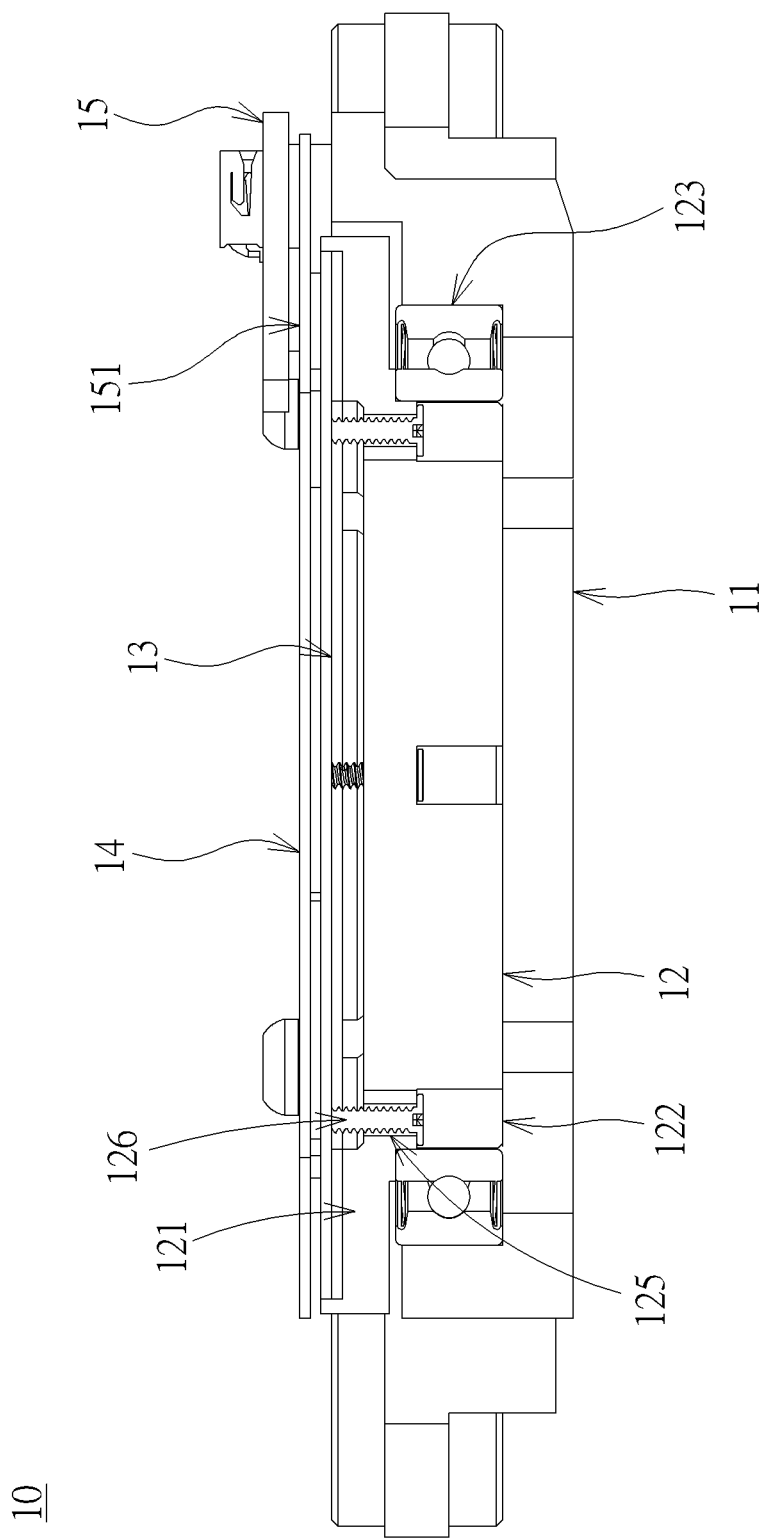
FIG. 2 is a sectional diagram of the encoder module according to the embodiment of the present invention.
Figure 3:
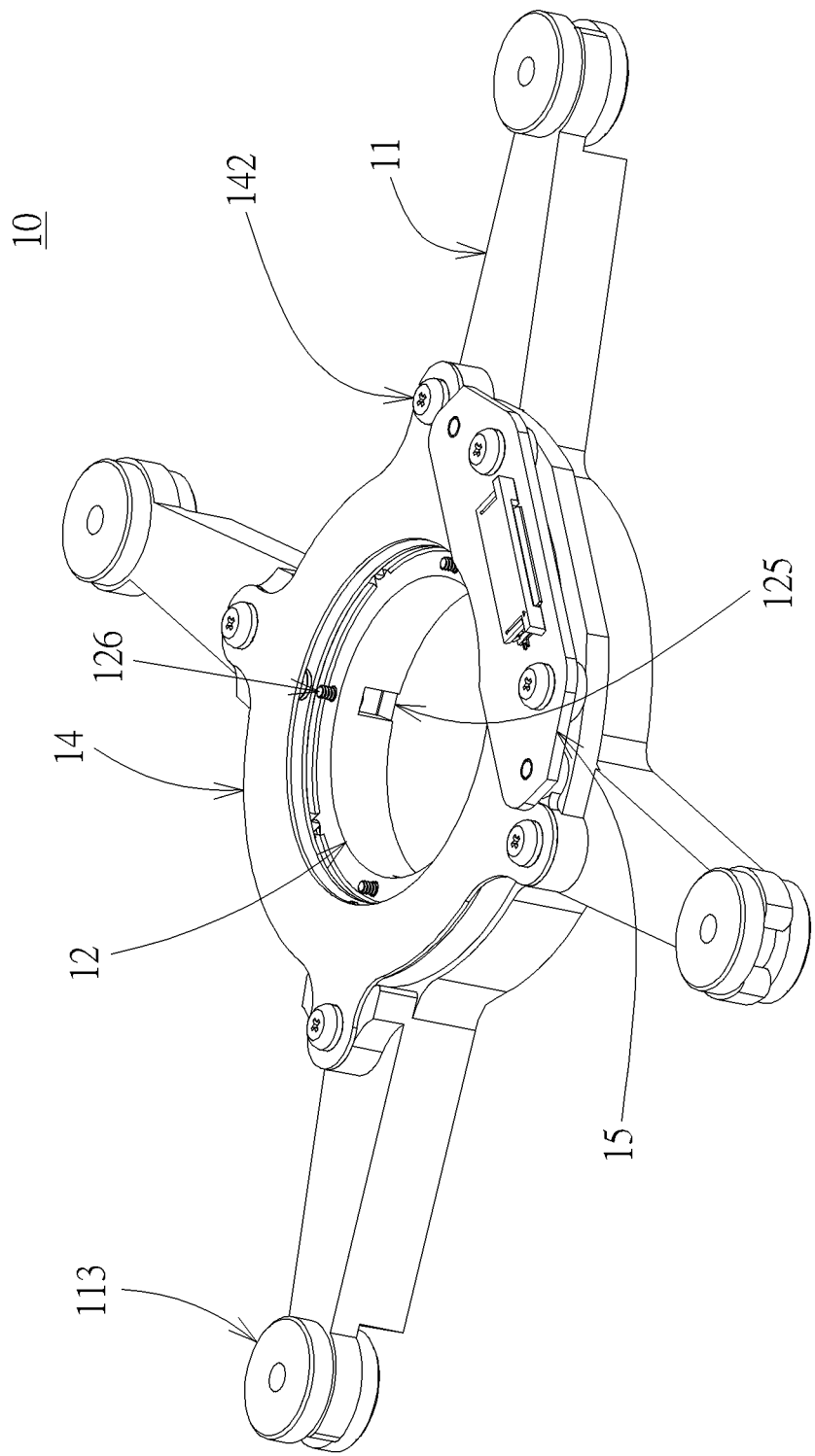
FIG. 3 is a diagram of the encoder module according to the embodiment of the present invention.
Figure 4:
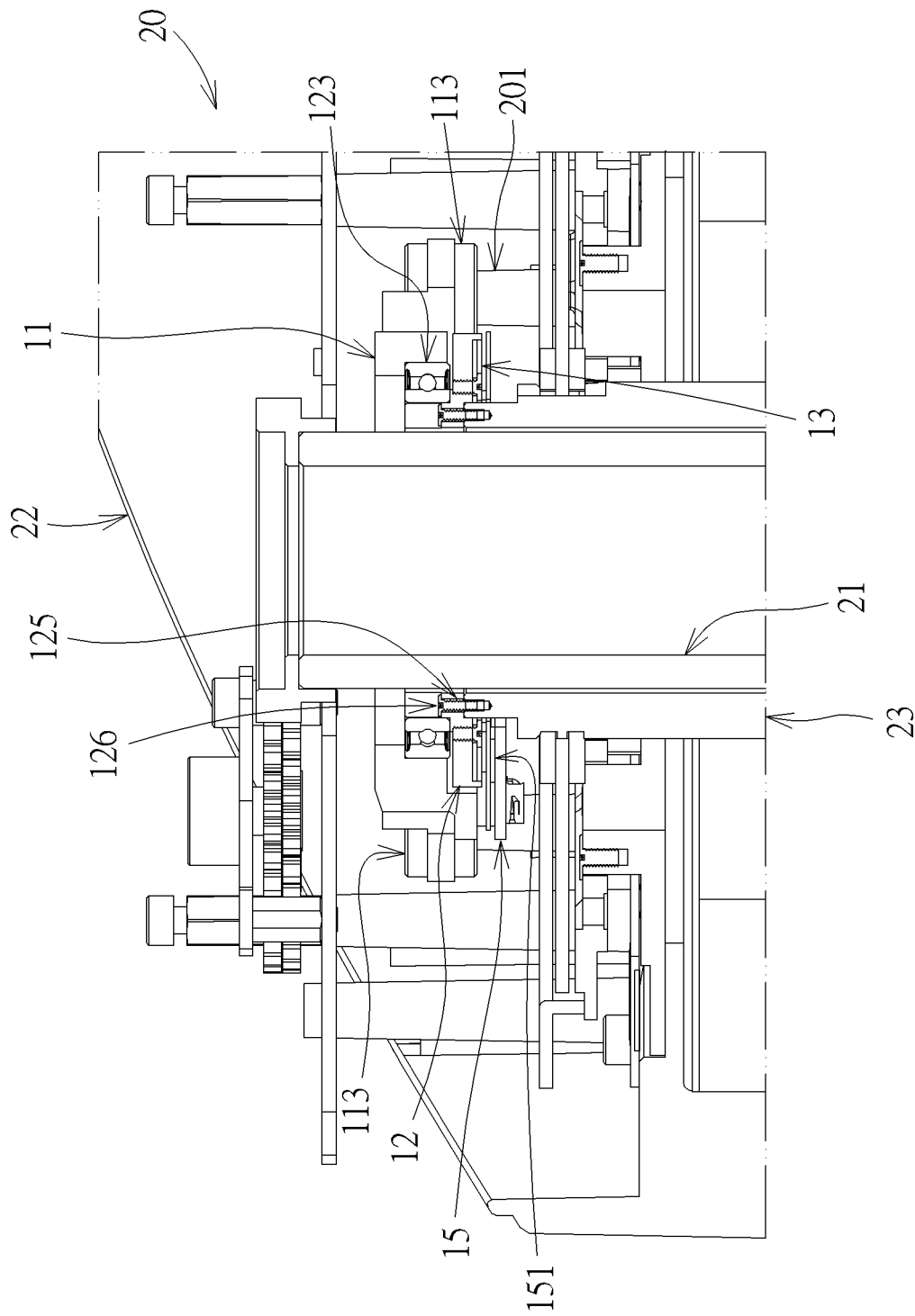
FIG. 4 is a partial sectional diagram of a robotic arm according to the embodiment of the present invention.
Figure 5:
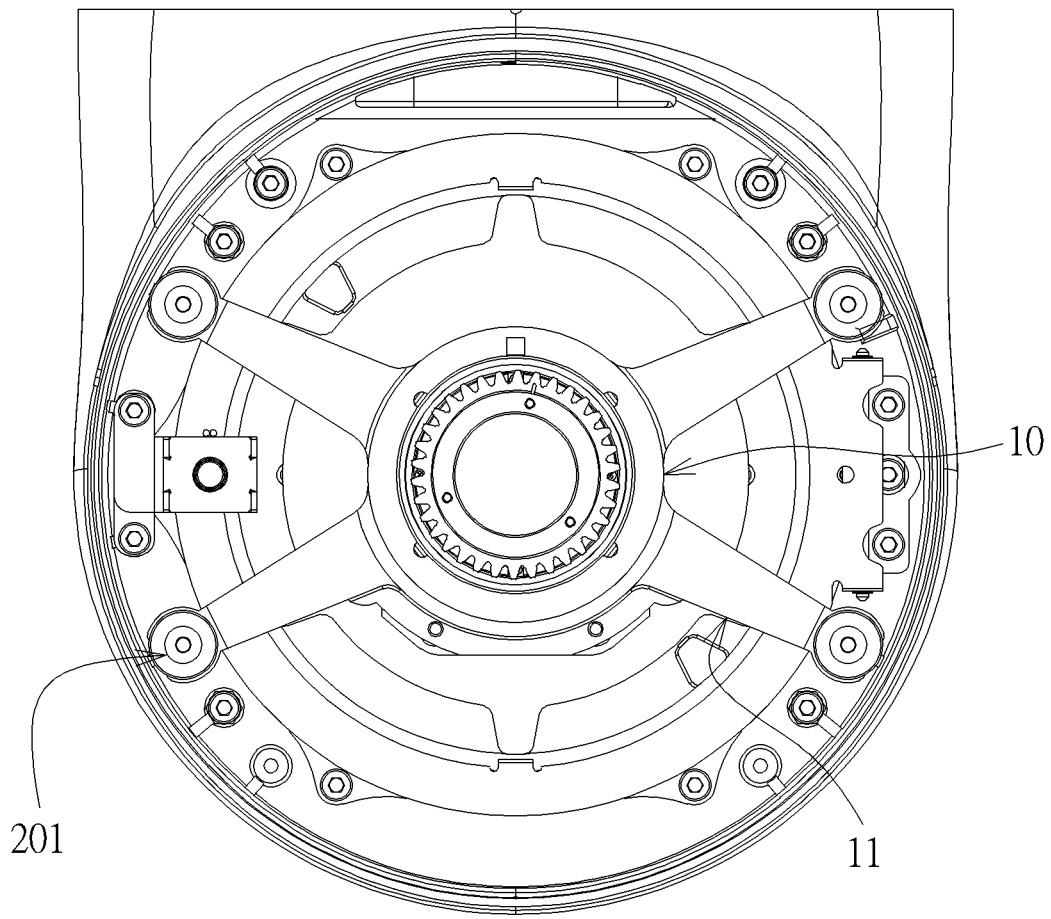
FIG. 5 is another partial sectional diagram of the robotic arm according to the embodiment of the present invention.
Figure 6:
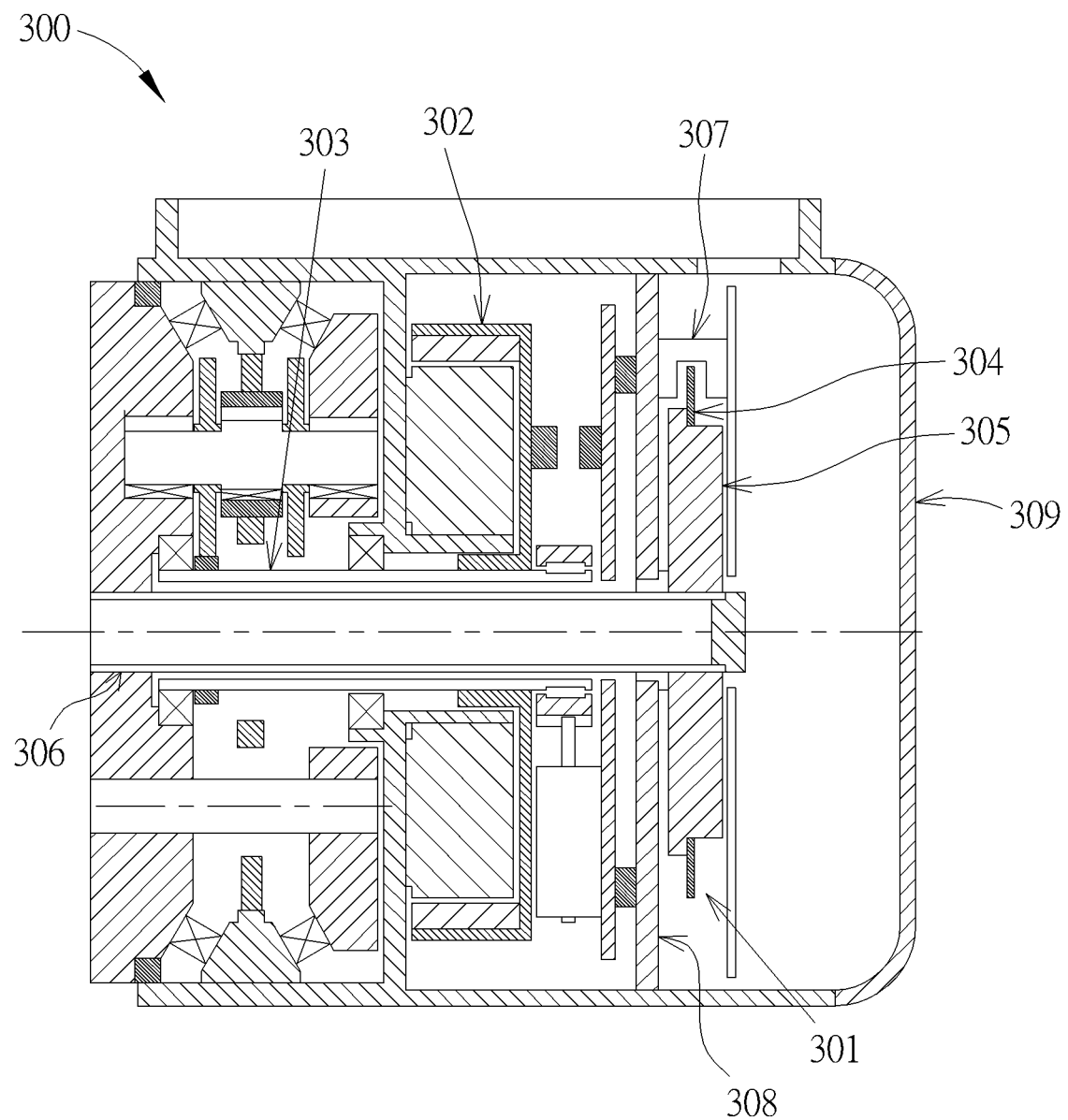
FIG. 6 is a partial sectional diagram of a joint assembly of a robotic arm in the prior art.

Please refer to FIG. 1 to FIG. 5. FIG. 1 is an exploded diagram of an encoder module 10 according to an embodiment of the present invention. FIG. 2 is a sectional diagram of the encoder module 10 according to the embodiment of the present invention. FIG. 3 is a diagram of the encoder module 10 according to the embodiment of the present invention. FIG. 4 is a partial sectional diagram of a robotic arm according to the embodiment of the present invention. FIG. 5 is another partial sectional diagram of the robotic arm according to the embodiment of the present invention. As shown in FIG. 1 to FIG. 5, the encoder module 10 includes a bracket 11, a bearing 123, an adaptor ring 12, an encoder plate 13, a dustproof cover 14 and a circuit board 15.

The bracket 11 includes a ring-shaped structure 111. A plurality of extending rods 112 extend from an outer periphery of the ring-shaped structure 111.

In this embodiment, the plurality of extending rods 112 are arranged in a radial symmetry. However, the present invention is not limited to this embodiment. For example, in another embodiment, the plurality of extending rods can be arranged randomly.

In this embodiment, as shown in FIGS. 1, 3, 4 and 5, the encoder module 10 further includes a plurality of resilient components 113. Each of the plurality of resilient components 113 is disposed on a distal end of the corresponding extending rod 112 for fixing the encoder module 10 on a shell 22 of a joint assembly 20 of the robotic arm. Specifically, each of the resilient components 113 can be sleeved on a corresponding protruding column 201 of the shell 22 of the joint assembly 20 of the robotic arm.

As shown in FIG. 1 to FIG. 3, the bearing 123 is embedded in the bracket 11. An inner periphery of the ring-shaped structure 111 engages with an outer periphery of the bearing 123. The adaptor ring 12 is embedded in the bearing 123 and fixed on a rotating shaft 23 of the joint assembly 20. The adaptor ring 12 includes a ring-shaped flange portion 121 and a protruding portion 122. The protruding portion 122 is located adjacent to an inner periphery of the ring-shaped flange portion 121 and protrudes from a first side of the ring-shaped flange portion 121. An outer periphery of the protruding portion 122 engages with an inner periphery of the bearing 123, so that the ring-shaped flange portion 121 and the ring-shaped structure 111 are disposed coaxially.

In this embodiment, as shown in FIG. 1 to FIG. 4, the encoder module 10 further includes at least one screw component 126. At least one connecting hole 125 is formed on the protruding portion 122. The at least one screw component 126 passes through the at least one connecting hole 125 to engage with the rotating shaft 23 of the joint assembly for fixing the adaptor ring 12 on the rotating shaft 23 of the joint assembly 20.

As shown in FIG. 1 to FIG. 3, the circuit board 15 is fixed on the bracket 11 by a plurality of fixing components 152 directly, and the circuit board 15 includes a detector 151.

The encoder plate 13 is fixed on a second side of the ring-shaped flange portion 121 opposite to the first side of the ring-shaped flange portion 121 by a plurality of fixing components 124. The encoder plate 13 is located at a position corresponding to the detector 151 and located between the detector 151 and the adaptor ring 12.

In this embodiment, the detector 151 includes at least one position detector 1511 for detecting the encoder plate 13. The encoder plate 13 is formed in a ring shape, and a rotating axis of the encoder plate 13 is aligned with a rotating axis of the rotating shaft 23 of the joint assembly 20. The encoder plate 13 includes a ring-shaped encoding scale track for angular measurement. Specifically, the detector 151 is located at a position corresponding to a central portion of the ring-shaped encoding scale track of the encoder plate 13 between an outer periphery of the encoder plate 13 and an inner periphery of the encoder plate 13.

The dustproof cover 14 is fixed on the bracket 11 and located between the circuit board 15 and the encoder plate 13. The dustproof cover 14 is spaced apart from the encoder plate 13 and covers the encoder plate 13 for preventing the ring-shaped encoding scale track from being contaminated or covered by dust, so as to prevent measurement error of the encoder module 10. At least one detecting hole 143 is formed on the dustproof cover 14 and located at a position corresponding to the at least one position detector 1511, so that the detector 151 detects the encoder plate 13 via the at least one detecting hole 143.

In this embodiment, the dustproof cover 14 is formed in a ring shape. A plurality of protruding lugs 141 protrude from an outer periphery of the dustproof cover 14. A number and a configuration of the plurality of protruding lugs 141 are corresponding to a number and a configuration of the plurality of extending rods 112 respectively, and the plurality of protruding lugs 141 are fixed on the plurality of extending rods 112 by a plurality of fixing components 142 respectively.

However, the present invention is not limited to this embodiment. For example, in another embodiment, the dustproof cover can be fixed on the ring-shaped structure of the bracket. Alternatively, in another embodiment, the dustproof cover can be omitted.

As shown in FIG. 1 to FIG. 3, when it is desired to assemble the encoder module 10, the bearing 123 can be embedded in the bracket 11 by engagement of the inner periphery of the ring-shaped structure 111 and the outer periphery of the bearing 123, and the adaptor ring 12 can be embedded in the bearing 123 by engagement of the outer periphery of the protruding portion 122 of the adaptor ring 12 and the inner periphery of the bearing 123, so as to dispose the ring-shaped flange portion 121 and the ring-shaped structure 111 coaxially. Afterwards, the encoder plate 13 can be fixed on the second side of the ring-shaped flange portion 121 by fastening the fixing components 124, and the dustproof cover 14 can be fixed on the bracket 11 for preventing the ring-shaped encoding scale track from being contaminated or covered by dust by fastening the fixing components 142. Then, the circuit board 15 can be fixed on the bracket 11 by fastening the fixing components 152, so as to locate the dustproof cover 14 between the circuit board 15 and the encoder plate 13 and locate the encoder plate 13 between the adaptor ring 12 and the detector 151

Afterwards, as shown in FIG. 4 and FIG. 5, when it is desired to assemble the encoder module 10 with the joint assembly 20, the ring-shaped structure 111 can be sleeved on the rotating shaft 23, and the resilient components 113 can be sleeved on the protruding columns 201 of the shell 22 of the joint assembly 20, so that the encoder module 10 can be fixed on the shell 22 of the joint assembly 20 by the resilient components 113. The at least one screw component 126 can pass through the at least one connecting hole 125 to engage with the rotating shaft 23 of the joint assembly 20 for fixing the adaptor ring 12 on the rotating shaft 23 of the joint assembly 20, so that the rotating axis of the rotating shaft 23 can be aligned with the rotating axis of the encoder plate 13. When the rotating shaft 23 rotates around the rotating axis of a hollow shaft 21, the rotating shaft 23 can drive the adaptor ring 12 to rotate, and the ring-shaped structure 111 of the bracket 11 can support the rotating adaptor ring 12 by the bearing 123. In such a way, the encoder plate 13 fixed on the adaptor ring 12 can rotate along with the adaptor ring 12 around the rotating axis of the encoder plate 13 aligned with the rotating axis of the rotating shaft 23. In this embodiment, the rotating shaft 23 of the joint assembly 20 is an input shaft. However, the present invention is not limited to this embodiment. For example, in another embodiment, the rotating shaft of the joint assembly 20 can be an output shaft.

In contrast to the prior art, in the present invention, by the aforementioned configuration, the rotating axis of the rotating shaft can be aligned with the rotating axis of the encoder plate, and the detector can be located at a position corresponding to the encoder plate. Furthermore, the present invention is capable of absorbing vibration caused by rotation of the joint assembly by the plurality of resilient components. Therefore, the present invention has less accumulated error and improved accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An encoder module adapted for a robotic arm, the encoder module comprising:
   a bracket comprising a ring-shaped structure, a plurality of extending rods extending from an outer periphery of the ring-shaped structure;
   a bearing embedded in the bracket, an inner periphery of the ring-shaped structure engaging with an outer periphery of the bearing;
   an adaptor ring embedded in the bearing, the adaptor ring comprising a ring-shaped flange portion and a protruding portion, the protruding portion being located adjacent to an inner periphery of the ring-shaped flange portion and protruding from a first side of the ring-shaped flange portion, an outer periphery of the protruding portion engaging with an inner periphery of the bearing;
   a circuit board fixed on the bracket and comprising a detector; and
   an encoder plate fixed on a second side of the ring-shaped flange portion opposite to the first side of the ring-shaped flange portion, the encoder plate being located at a position corresponding to the detector and located between the detector and the adaptor ring.

2. The encoder module of claim 1, further comprising a dustproof cover fixed on the bracket and located between the circuit board and the encoder plate, the dustproof cover being spaced apart from the encoder plate and covering the encoder plate.

3. The encoder module of claim 2, wherein the dustproof cover is formed in a ring shape, a plurality of protruding lugs protrude from an outer periphery of the dustproof cover, a number and a configuration of the plurality of protruding lugs are corresponding to a number and a configuration of the plurality of extending rods respectively, and the plurality of protruding lugs are fixed on the plurality of extending rods respectively.

4. The encoder module of claim 2, wherein at least one detecting hole is formed on the dustproof cover, and the detector detects the encoder plate via the at least one detecting hole.

5. The encoder module of claim 1, further comprising a plurality of resilient components, each of the plurality of resilient components being disposed on a distal end of the corresponding extending rod, and the encoder module being fixed on a shell of a joint assembly of the robotic arm by the plurality of resilient components.

6. The encoder module of claim 5, further comprising at least one screw component, at least one connecting hole being formed on the protruding portion, the at least one screw component passing through the at least one connecting hole to engage with a rotating shaft of the joint assembly for fixing the adaptor ring on the rotating shaft of the joint assembly.

7. The encoder module of claim 6, wherein the rotating shaft of the joint assembly is an output shaft or an input shaft.

8. The encoder module of claim 6, wherein a rotating axis of the encoder plate is aligned with a rotating axis of the rotating shaft.

9. The encoder module of claim 1, wherein the plurality of extending rods are arranged in a radial symmetry.

10. The encoder module of claim 1, wherein the detector is located at a position corresponding to a central portion of the encoder plate between an outer periphery of the encoder plate and an inner periphery of the encoder plate.

* * * * *